United States Patent
Nishihara et al.

(10) Patent No.: US 9,019,239 B2
(45) Date of Patent: Apr. 28, 2015

(54) CREATIVE DESIGN SYSTEMS AND METHODS

(75) Inventors: H. Keith Nishihara, Los Altos, CA (US); Shi-Ping Hsu, Pasadena, CA (US); Donald G. Lariviere, Hollywood, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 721 days.

(21) Appl. No.: 12/955,563

(22) Filed: Nov. 29, 2010

(65) Prior Publication Data

US 2012/0133616 A1   May 31, 2012

(51) Int. Cl.
| | |
|---|---|
| G06F 3/042 | (2006.01) |
| G09G 3/28 | (2013.01) |
| G06F 3/033 | (2013.01) |
| G06F 3/03 | (2006.01) |
| G06F 3/0346 | (2013.01) |
| G06F 3/0354 | (2013.01) |

(52) U.S. Cl.
CPC ............ *G06F 3/0428* (2013.01); *G06F 3/0325* (2013.01); *G06F 3/0346* (2013.01); *G06F 3/03542* (2013.01)

(58) Field of Classification Search
CPC .......... G06F 3/041; G06F 3/042; G06F 3/037
USPC ................. 345/156–158, 163–166, 173, 175, 345/179–184; 178/19.05
See application file for complete search history.

(56) References Cited

U.S. PATENT DOCUMENTS

| | | | |
|---|---|---|---|
| 4,746,770 A | 5/1988 | McAvinney | |
| 6,421,042 B1 * | 7/2002 | Omura et al. | 345/157 |
| 6,614,422 B1 | 9/2003 | Rafii et al. | |
| 6,803,906 B1 | 10/2004 | Morrison et al. | |
| 7,817,816 B2 * | 10/2010 | Wang et al. | 382/100 |
| 2001/0022575 A1 * | 9/2001 | Woflgang | 345/156 |
| 2005/0280739 A1 * | 12/2005 | Lin et al. | 348/607 |
| 2006/0012579 A1 * | 1/2006 | Sato | 345/173 |
| 2006/0022963 A1 * | 2/2006 | Bosch et al. | 345/179 |
| 2009/0160801 A1 * | 6/2009 | Morrison et al. | 345/173 |

(Continued)

FOREIGN PATENT DOCUMENTS

| | | |
|---|---|---|
| EP | 1 550 940 A2 | 7/2005 |
| WO | WO 02/03316 A1 | 1/2002 |
| WO | WO 2009/146544 A1 | 12/2009 |

OTHER PUBLICATIONS

European Search Report for corresponding EP 11 17 8066, completed Oct. 25, 2012.

*Primary Examiner* — Lun-Yi Lao
*Assistant Examiner* — Jarurat Suteerawongsa
(74) *Attorney, Agent, or Firm* — Tarolli, Sundheim, Covell & Tummino LLP

(57) ABSTRACT

Creative design systems and methods are disclosed. In one embodiment, a creative design system is provided. The creative design system comprises a high resolution display, an interactive stylus that includes a transmitter at a tip of the interactive stylus that transmits an encoded signal associated with the interactive stylus and a plurality of sensors that track movement of the interactive stylus over the high resolution display by capturing and decoding the transmitted encoded signal as the stylus moves over the high resolution display. A creative design controller is configured to display sketches of context in response to the tracking of the movement of the interactive stylus over the high resolution display.

24 Claims, 16 Drawing Sheets

(56) References Cited

U.S. PATENT DOCUMENTS

| | | | |
|---|---|---|---|
| 2010/0207911 A1* | 8/2010 | Newton | 345/175 |
| 2011/0006981 A1 | 1/2011 | Chtchentinine et al. | |
| 2011/0115814 A1* | 5/2011 | Heimendinger et al. | 345/619 |
| 2011/0242060 A1* | 10/2011 | McGibney et al. | 345/179 |
| 2011/0310006 A1* | 12/2011 | Edwards et al. | 345/156 |
| 2012/0044180 A1* | 2/2012 | Matsui et al. | 345/173 |

* cited by examiner

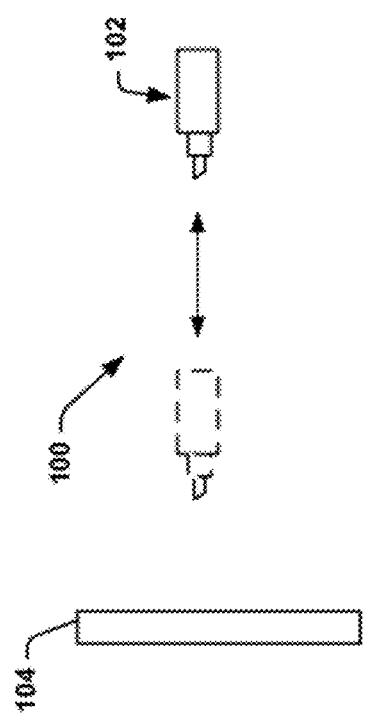
FIG. 8
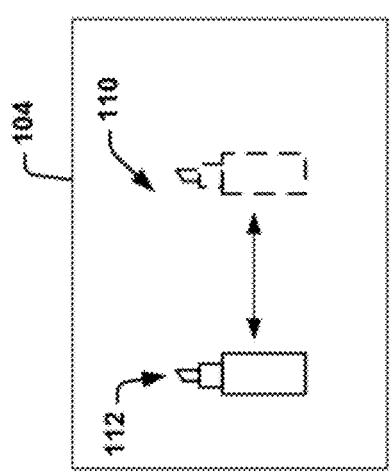
FIG. 9
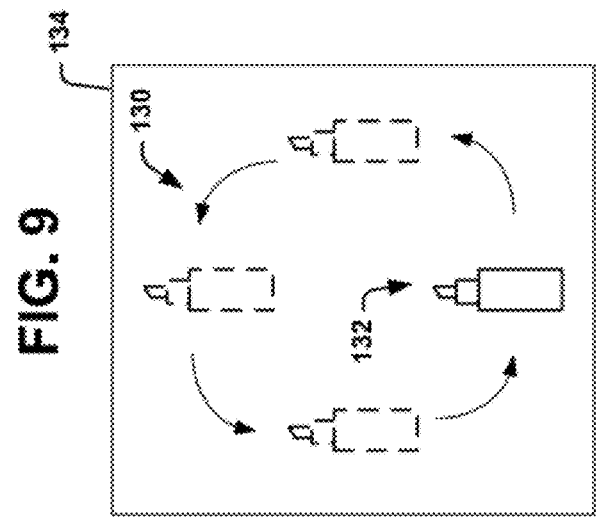
FIG. 10
FIG. 11

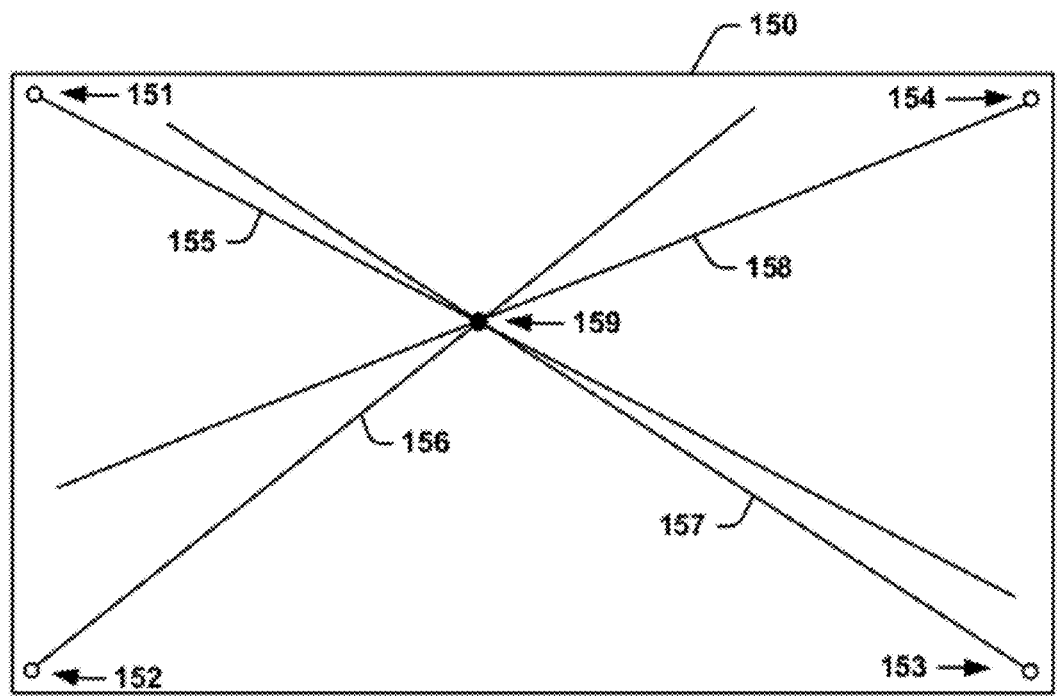
FIG. 12
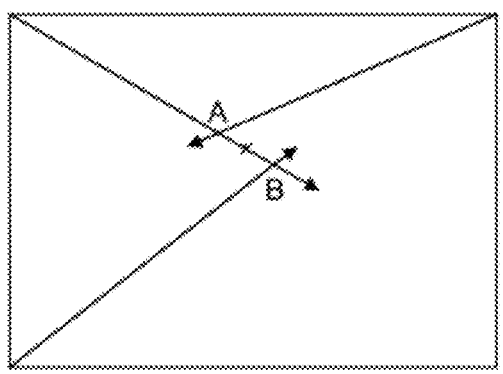 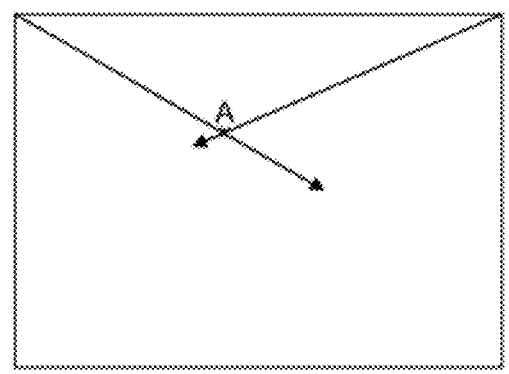
FIG. 13     FIG. 14

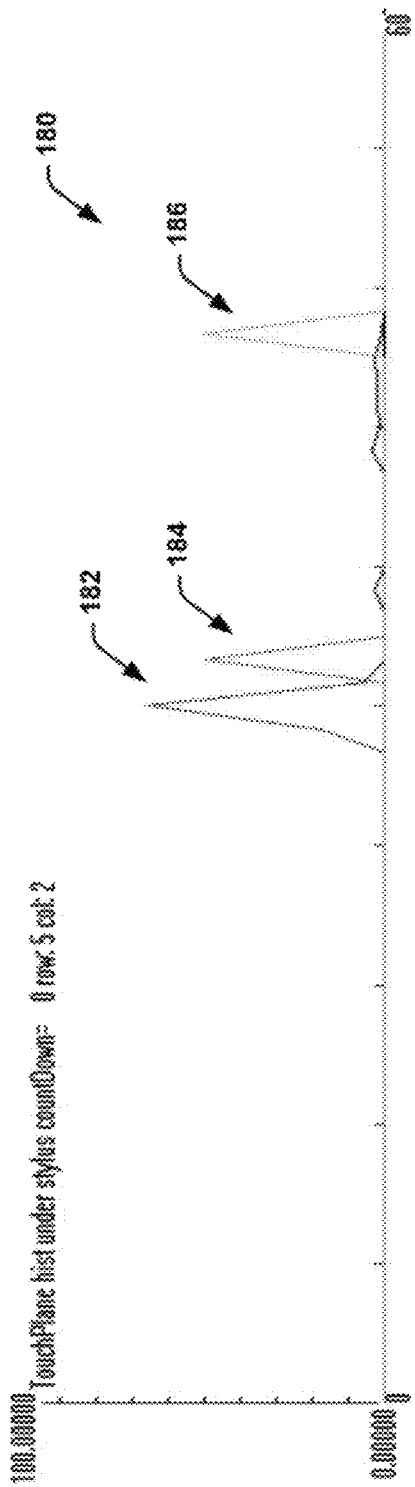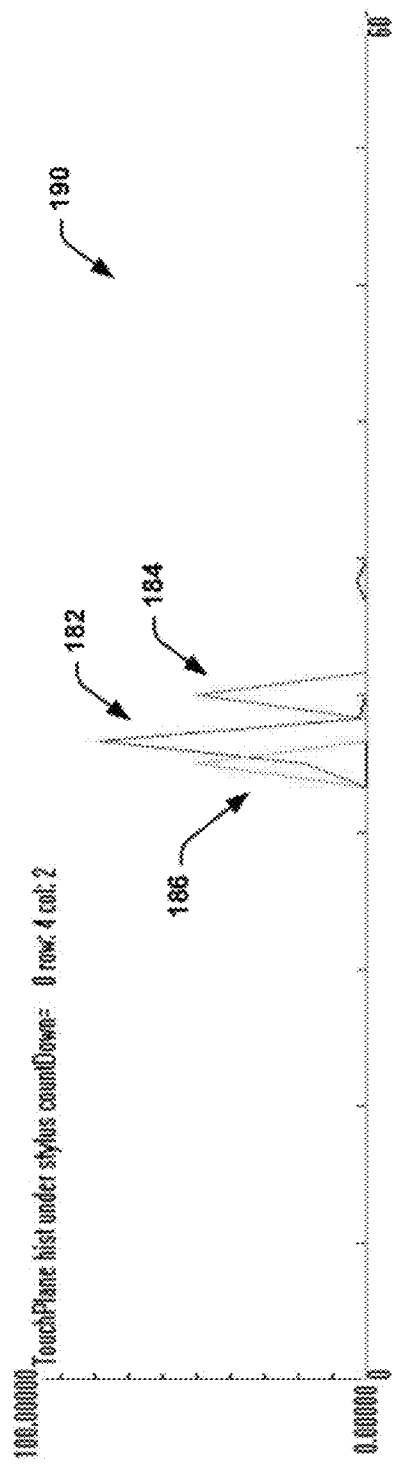

CREATIVE DESIGN SYSTEMS AND METHODS

TECHNICAL FIELD

The present invention relates generally to design tools, and more particularly to creative design systems and methods.

BACKGROUND

Video teleconference systems (VTCs) are used to connect meeting participants from one or more remote sites. This allows for many participants to review material and collaborate on the material across a geographically distributed area. VTCs are a useful tool for supporting geographically distributed review of engineering designs and artifacts. There are many network based tools, such as GoToMeeting, WebEx and many others, that are useful tools for supporting geographically distributed review of engineering designs and artifacts. However, these tools are ineffective for supporting creation of engineering artifacts and design.

SUMMARY

In one aspect of the invention, a creative design system is provided. The creative design system comprises a high resolution display, an interactive stylus that includes a transmitter at a tip of the interactive stylus that transmits an encoded signal associated with the interactive stylus and a plurality of sensors that track movement of the interactive stylus over the high resolution display by capturing and decoding the transmitted encoded signal as the stylus moves over the high resolution display. A creative design controller is configured to display sketches of context in response to the tracking of the movement of the interactive stylus over the high resolution display.

In another aspect of the invention, a creative design system is provided that includes a high resolution display, an interactive stylus that includes an infrared transmitter located at its tip that generates infrared light and an infrared camera located in each corner of the high resolution display that captures images to track movement of the infrared light over the high resolution display. A creative design controller is configured to display preloaded detailed text and figures and generate instructions to display sketches of context in response to movement of the infrared light over the high resolution display based on a determined sub-pixel estimate of a bright spot from the infrared light in the captured images.

In yet another aspect of the invention a method for providing creative design comprises capturing images of a transmitter of an interactive stylus with a plurality of cameras as it is moved over a high resolution display, analyzing the captured images and employing triangulation to determine a location of the transmitter of the interactive stylus and generating instructions to display sketches of context in response to the determined movement of the transmitter of the interactive stylus over the high resolution display.

BRIEF DESCRIPTION OF THE DRAWINGS

FIG. 8 illustrates a gesture of shaking an interactive stylus toward a high resolution display in accordance with an aspect of the present invention.

FIG. 9 illustrates a gesture of shaking an interactive stylus horizontally sideways relative to a high resolution display in accordance with an aspect of the present invention.

FIG. 10 illustrates a gesture of shaking an interactive stylus parallel to a vertical axis of a high resolution display in accordance with an aspect of the present invention.

FIG. 11 illustrates a gesture of rotating an interactive stylus in a circular motion about x, y and/or z axis of a high resolution display in accordance with an aspect of the present invention.

FIG. 12 illustrates triangulation geometry over a high resolution display of a creative design system in accordance with an aspect of the present invention.

FIG. 13 illustrates three cameras detecting a stylus with two intersections being computed in accordance with an aspect of the present invention.

FIG. 14 illustrates flicker induced jitter when one of the three cameras in FIG. 13 fails to detect the stylus tip leaving only one intersection.

FIG. 19 illustrates an examples of a first Z histogram in which a stylus is not contacting a high resolution display in accordance with an aspect of the present invention.

FIG. 20 illustrates an examples of a second Z histogram in which a stylus is contacting a high resolution display in accordance with an aspect of the present invention.

DETAILED DESCRIPTION

Figure 1:
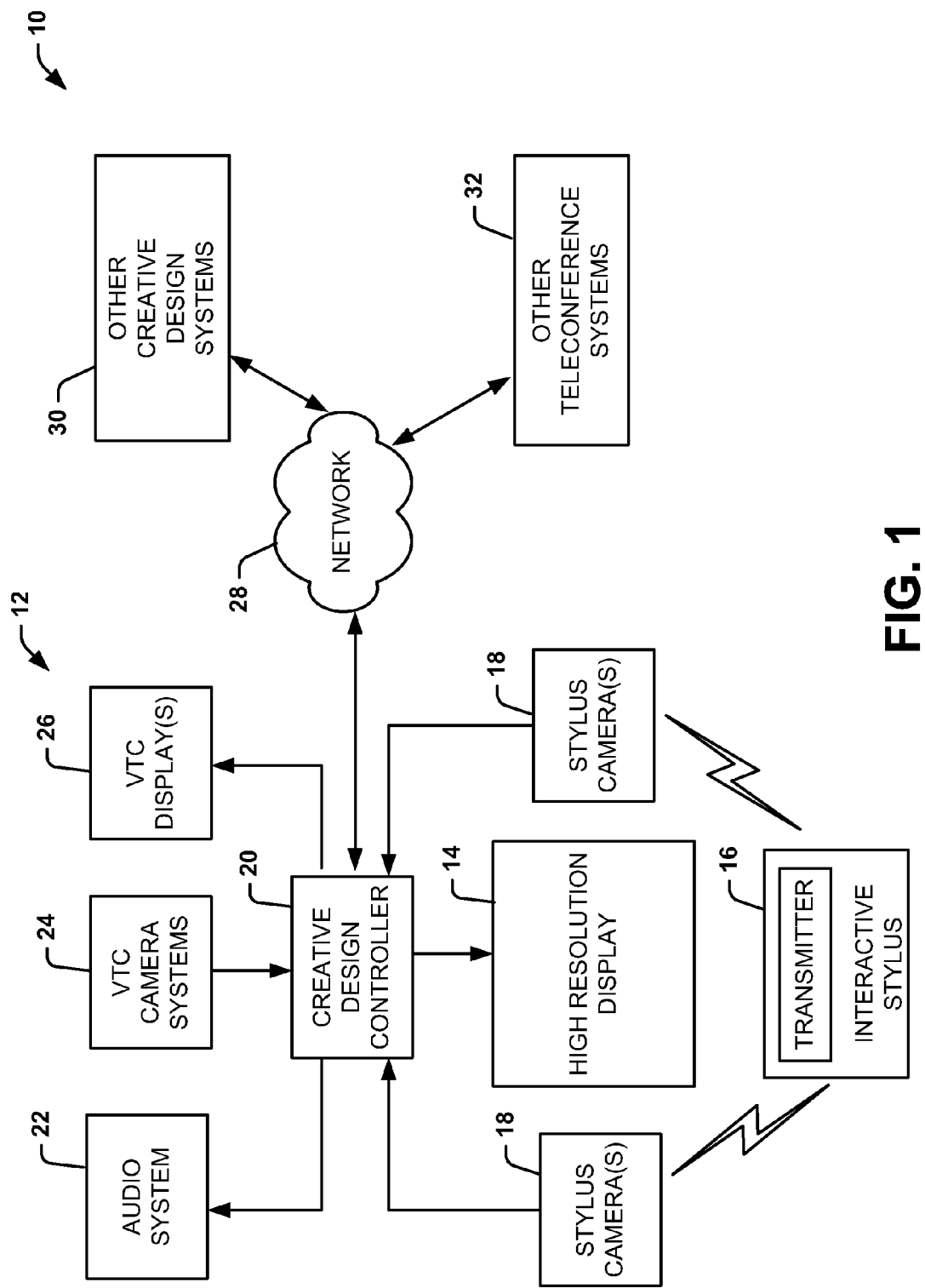
FIG. 1 illustrates a block diagram of network coupled system for providing geographically distributed creative design in accordance with an aspect of the present invention.

FIG. 1 illustrates a network coupled system 10 for providing geographically distributed creative designs in accordance with an aspect of the present invention. The system 10 includes a local creative design system 12 coupled to one or more other creative design systems 30 through a communication medium 28. The communication medium 28 can be a local-area or wide-area network (wired or wireless), or a mixture of such mechanisms, which provides one or more communication mechanisms (e.g., paths and protocols) to pass data and/or control between creative design systems and other video teleconferencing systems 32 that do not have the functionality associated with a creative design system.

The local creative design system 12 includes a high resolution display 14 (e.g., typically greater than or equal to 8 Megapixels) that is sufficient to provide for the display of detail text and figures viewable within a teleconference room setting. The high resolution display 14, stylus sensors 18, an interactive stylus 16 and a creative design controller 20 cooperate to allow for a user (e.g., a design engineer) to sketch creative designs on the high resolution display 14 similar to how users sketch creative designs on a large white board. The creative design controller can be a host computer that includes hardware and software to perform the functions as discussed herein. The creative designs appear in the form of images on the high resolution display 14 and provide the context necessary for a creative design meeting. The detail text and figures can be preloaded onto the high resolution display 14 prior to a creative design session. Changes in the sketched images due to actions by a user are employed to create message instructions that can be transmitted to other creative design systems 30 to update high resolution displays associated with each of the other creative design systems 30. In this manner, updates to images on each respective high resolution display occur substantially in real-time to provide substantially real-time sketching since the amount of data transferred over the communication medium 28 is a fraction of the amount of data that would be required to completely update each high resolution display.

Movement of the interactive stylus 16 is tracked by the stylus sensors 18 and transmitted to the creative design controller 20. The creative design controller 20 analyzes the images of the movement of the stylus 16 and automatically generates markings on the high resolution display 14 in response to sketching by a user. Since the markings are generated by the controller 20, the markings can have a preprogrammed width that can be as small as 1 pixel wide allowing for complex detailed sketches and as thick as would be reasonable for sketching drawings on a high resolution display.

The interactive stylus 16 includes a transmitter located at an end point of the interactive stylus and the stylus sensors 18 monitor the movement of the transmitter to determine when to display sketching images in response to sketches by a user on the high resolution display 14. The transmitter can transmit encoded signals and/or transmit signals in response to activation of a button on the interactive stylus 16. For example, based on how close an end tip of the stylus 16 is to the high resolution display 14. In accordance with an aspect of the invention, the interactive stylus 16 has an end that includes an infrared transmitter and the stylus sensors 18 can be infrared cameras. However, it is to be appreciated that the transmitter end could transmit visible light, radio frequency signals or other signals that can be tracked by different types of stylus sensors.

The local creative design system 12 can include one or more video teleconferencing cameras 24 for capturing images of participants at the local location of the video teleconference meeting where the high resolution display 14 resides and transmitting those images to other remote creative design systems 30 and other remote teleconference systems 32. The local creative design system 12 can include one or more video teleconferencing (VTC) displays 26 for displaying participants from the other remote creative design systems 30 and other remote teleconference systems 32. Additionally, the local creative design system 12 can include an audio system 22 that may include one or more speakers for receiving audio data from the other remote creative design systems 30 and other remote teleconference systems 32 and providing voice sounds associated with the audio data. The audio system 22 can also include one or more microphones for capturing voice sounds of the participants at the local creative design location 12 and providing audio data produced by the voice sounds of the participants to be transmitted to the other remote creative design systems 30 and other remote teleconference systems 32.

Figure 2:
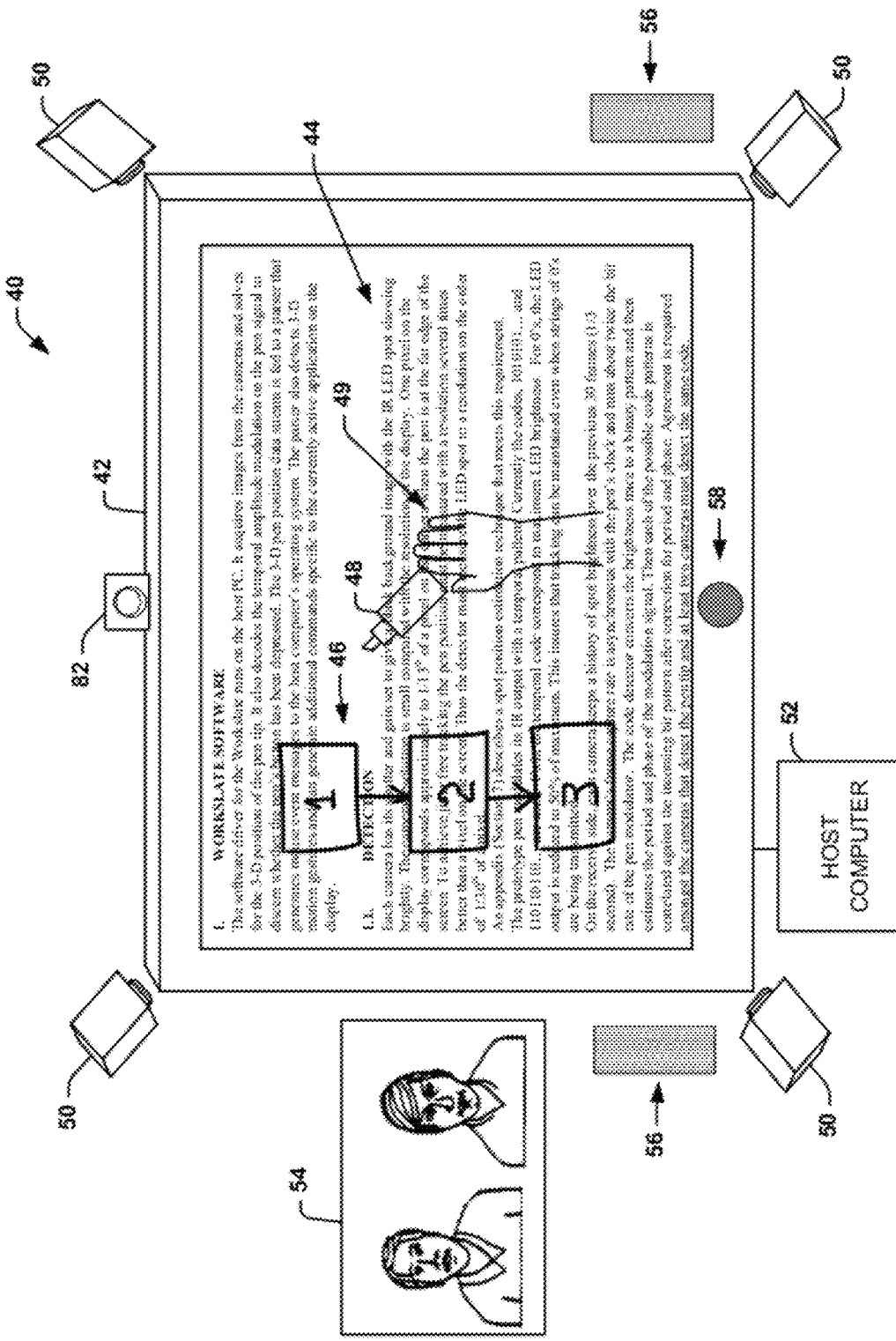
FIG. 2 illustrates a portion of a creative design system in accordance with an aspect of the present invention.
Figure 3:
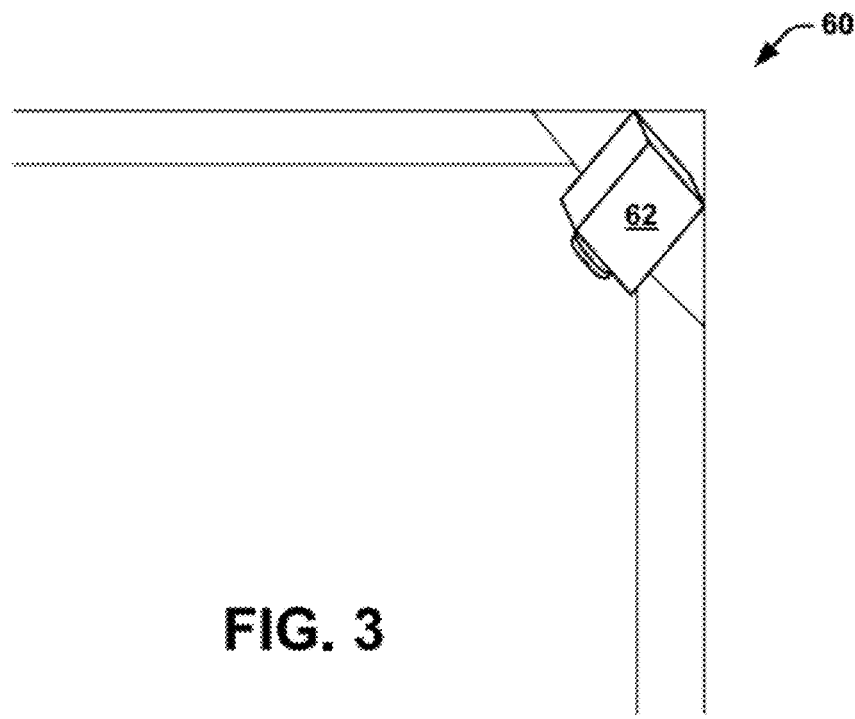
FIG. 3 illustrates a camera mounted to an upper left corner of a high resolution display in accordance with an aspect of the present invention.

FIG. 2 illustrates a portion of a creative design system 40 in accordance with an aspect of the present invention. The system 40 includes a high resolution display 42 (e.g., typically greater than or equal to 8 Megapixels) that provides for the display of detail text and figures 44 viewable within a teleconference room setting. The system includes four stylus sensors 50 in the form of cameras located at each corner of the display 42. The cameras 50 track the movement of an interactive stylus 48 employed by a user to allow for a user (e.g., a design engineer) to sketch creative designs 46 on the high resolution display 42 similar to how users sketch creative designs on a large white board. The movement of the interactive stylus 48 can be tracked by employing triangulation utilizing two cameras. Although only two cameras are necessary to track movement of the stylus 48, two additional cameras can be employed to track the stylus 48 when a users' hand 49 blocks the stylus 48 from the cameras 50 while sketching creative designs on the display 42. Although the cameras 50 are illustrated as being mounted outside the display 42, the cameras 50 can be fabricated into an outer frame of the display 42. The interactive stylus generates a temporally modulated signal, and analysis software residing in a host computer 52 detects the stylus tip in the camera images and computes the stylus tip position in 3-D. As illustrated in FIG. 3, high resolution detailed text 44 is displayed on the display 42, while a user has sketched a flow diagram 46 on the display such that both detail and context can be provided on the high resolution display 42.

The creative design system 40 can include a video teleconferencing camera 82 for capturing images of the user at the local location of the video teleconference meeting where the high resolution display 42 resides and transmitting those images to other remote creative design systems and other remote teleconference systems. The creative design system 40 also includes a video teleconferencing (VTC) display 54 for displaying participants from the other remote creative design systems and other remote teleconference systems. Additionally, the creative design system 40 includes an audio system with a pair of speakers 56 for receiving audio data from the other remote creative design systems and other remote teleconference systems and providing voice sounds associated with the audio data. The audio system includes a microphone 58 for capturing voice sounds of the participants at the creative design system location and providing audio data produced by the voice sounds of the participants to be transmitted to other remote creative design systems and other remote teleconference systems.

In one aspect of the invention, four cameras are mounted embedded in the corners of a display bezel 60 that surrounds the high resolution display. FIG. 3 illustrates an upper left corner camera 62 with the bezel cover removed. In an aspect of the present invention, each camera can have a wide angle lens that spans the 90 degree field of view from the corner with a 950 nm broadband interference filter mounted behind the camera lens. Each camera can be fitted with a bandpass IR filter matched to the wavelength of an IR LED in the interactive stylus. The cameras can operate at a 168 Hz frame rate capturing 752 by 120 pixel images. The four cameras can be synchronized with each other and interface to the host PC over an IEEE 1394a interface.

Each camera has its shutter and gain set to give a black background image with the IR LED spot showing brightly. The camera resolution is small compared with the resolution of the display. One pixel on the display corresponds approximately to $1/13^{th}$ of a pixel on the camera when the pen is at the far edge of the screen. To achieve jitter free tracking the pen position is measured with a resolution several times better than a pixel on the screen. On the receive side, each camera keeps a history of spot brightness over the previous 30 frames ($1/3$ second). The camera's frame capture rate is asynchronous with the pen's clock and runs about twice the bit rate of the pen modulator. The code detector converts the brightness trace to a binary pattern and then estimates the period and phase of the modulation signal. Then each of the possible code patterns is correlated against the incoming bit pattern after correction for period and phase. Agreement is required amongst the cameras that detect the pen tip and at least two cameras need to detect the same code.

Figure 4:
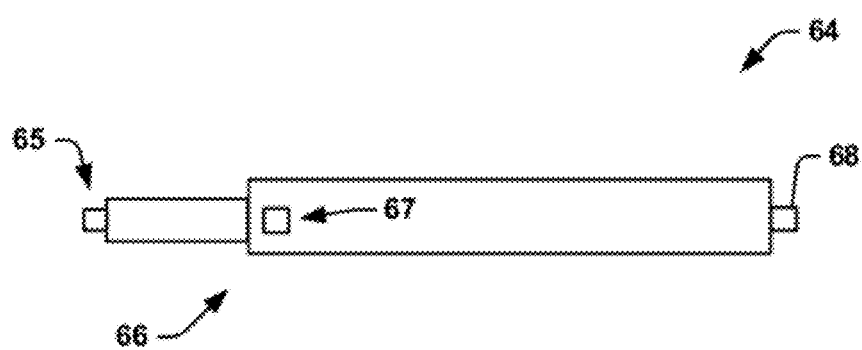
FIG. 4 illustrates an example of an assembled interactive stylus in accordance with an aspect of the present invention.
Figure 5:
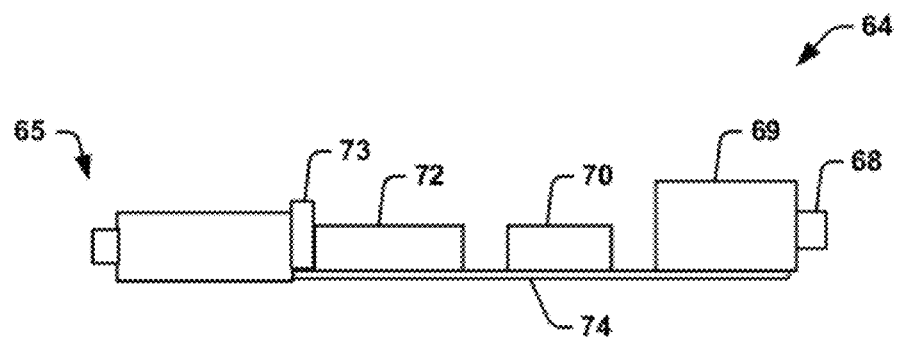
FIG. 5 illustrates an example of the interactive stylus with a portion of the body removed to show the internal components of the interactive stylus in accordance with an aspect of the present invention.

FIG. 4 illustrate an example of an assembled interactive stylus 64 having whiteboard marker shells that form a body 66 of the stylus with a 940 nm light emitting diode (LED) 65 mounted in its tip. The LED's body has been sanded to give it a frosted texture that scatters its output to the sides. A button 67 on the stylus body 66 allows mode control such as a right mouse click. FIG. 5 illustrates an example of the interactive stylus with a portion of the body removed to show the internal components of the interactive stylus 64. A microprocessor 72 mounted on a printed circuit board (PCB) 74 imposes a temporal modulation on the IR amplitude of the LED 65 to signal whether the button 67 on the pen body 66 is depressed based on receiving a signal from a button contact 73 that interfaces with the microprocessor 72. The stylus 64 can be powered by a battery 69 through interface 70. The battery 69 can be rechargeable through a recharge jack 68.

If more than one pen is used, each pen can be assigned different codes to distinguish between them. The processor 72 can be programmed to go into a low power sleep mode after several minutes. Pushing its button wakes it up again.

The processor 72 modulates the LED output with a repeating amplitude modulation that is detected by the IR cameras. This encoding can be used to signal the state of the stylus button 67. For example, a repeating 110110110110 code can correspond to stylus button up and a repeating 101010101010 code can correspond to stylus button down. One's in the codes above correspond to the high level from the LED and zero's correspond to the 50% brightness level. In this implementation, the 50% level is achieved by driving the LED with a 40 KHz square wave. The duration of each bit in the code pattern is about 25 milliseconds. Thus the 101010 pattern has a period of about 50 ms. The 110110110 pattern has a period of about 75 ms. In an aspect of the invention, additional codes are used to distinguish multiple pens.

A recharging stand consisting of a cylindrical cup that the stylus fits into could serve as a guide to help mate the pen's charging jack 68 with a male plug at the bottom of the cup. An inductive charging arrangement could also be employed but that would require designing a charging circuit into the pen body as well. An orientation sensor can be mounted on the PCB 74 to add an orientation sensor to keep the interactive stylus 64 active so long as the stylus is being handled, and wake it up when it is handled.

Figure 6:
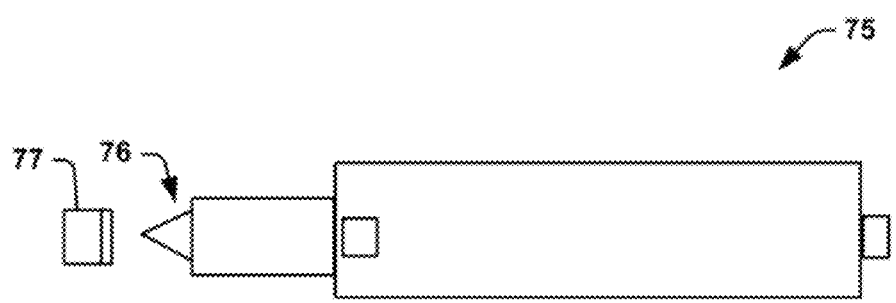
FIG. 6 illustrates an interactive stylus that utilizes a light pipe from an infra-red (IR) light emitting diode (LED) to a conical tip that deflects light to the sides in accordance with an aspect of the present invention.

FIG. 6 illustrates an interactive stylus 75 that utilizes a light pipe from an IR light emitting diode (LED) to a conical tip 76 that deflects light to the sides for better visibility by stylus cameras. A small cap 77 can be fit over the conical tip 76 to affect the feel of the stylus when writing. In another aspect of the invention, a small spring mechanism (not shown) can be added to the stylus tip to give some tactile feedback about the distance to the surface. This could be used to translate increased hand pressure on the stylus into bolder strokes. The light pipe used to improve the sideways transmission of IR light from the stylus tip can be designed to have a plunger run through its center so that its tip hits the screen and resists bringing the light emitting part of the stylus closer to the screen unless greater pressure is exerted.

In another aspect of the invention, stylus tip pressure sensing (not shown) is employed. Stylus tip pressure sensing enables an enhancement of human factors for writing and drawing with an electronic stylus. For example, drawn lines could be made bolder when more pressure is applied. Similarly, calligraphic effects such as feathering of brush strokes on lift up from the page could be accomplished. One technique for making a pressure measurement entails adding a transparent sleeve (not shown) coaxial to the active light emitter such that it can side with a plunger action over a few millimeters range. A spring (not shown) would keep it extended and provide an appropriate resistance to user applied pressure to the display surface. Under increased pressure, the enclosed LED emitter or light pipe would move closer to the display surface allowing the cameras to measure a closer spacing of the bright spot. An alternative design would place a thin solid rod through the center of the light pipe. This can look much like a lead in a mechanical pencil. Again a spring backing would keep the center rod extended until user applied force pushes it back into the light pipe.

Another simpler mechanism for measuring downward force on the stylus is to exploit the small deformation the screen surface exhibits when the stylus is pressed against it. This deformation gives a displacement approximately proportional to the amount of force exerted. A further alternative design would not use distance between the stylus' bright spot and the display screen as a measure of force but would instead incorporate a mechanism within the stylus to measure the applied force on the pen tip and transmit that information to a host computer by another mechanism such as by a wireless interface like Bluetooth. A wireless connection would also allow the force measurement to be used to make a more precise touch detector than can be accomplished using the cameras.

Figure 7:
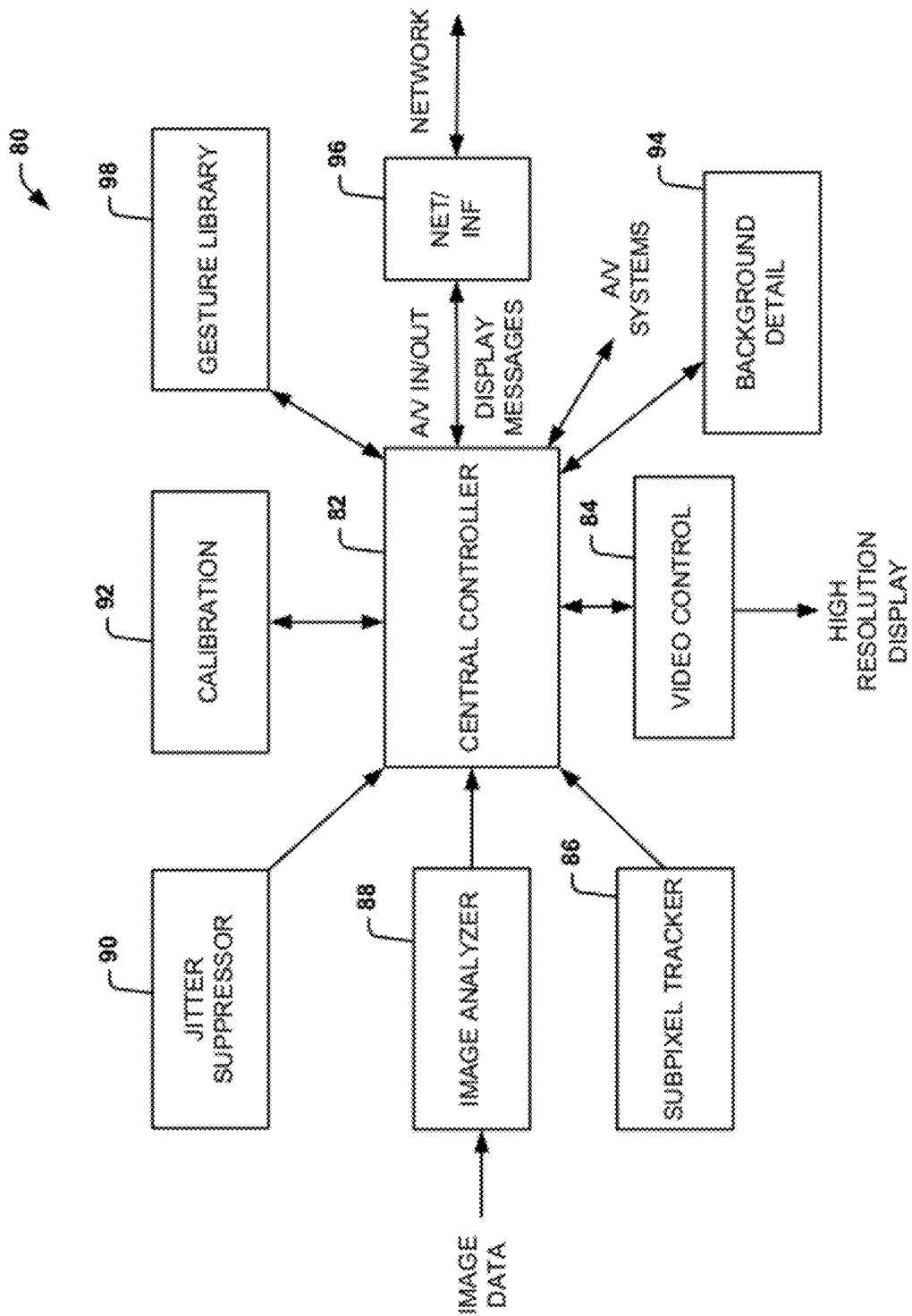
FIG. 7 illustrates a block diagram of a creative design controller in accordance with an aspect of the present invention.

FIG. 7 illustrates a block diagram of a creative design controller 80 in accordance with an aspect of the present invention. The creative design controller 80 includes a central controller 82 that loads background detail 94, such as text and figures viewable within a teleconference room setting, onto the high resolution display via a video controller 84. The central controller 82 can be a central processor unit and associated hardware and/or software for performing functions of the central controller 82, such as a host computer or host teleconference system. The background detail 94 can be loaded from a memory associated with the creative design controller 80 or be received remotely through a network interface 96. The same background detail can be loaded and displayed at other creative design systems and/or video teleconference systems. An image analyzer 88 receives image data from the stylus sensors to determine changes in the movement location of the stylus, which are provided to the central controller 82. The central controller 82 then provides instructions to the video controller 84 to draw sketches on the high resolution display based on the movement of the interactive stylus relative to the high resolution display. The central controller 82 can also packetize these instructions to be sent to one or more other creative design systems over a network via the network interface 96 so that high resolution displays at the other creative design systems.

The central controller 82 also receives audio and video data from other creative design systems and other teleconference systems and provides that data to the audio and video systems of the local creative design system 80 to provide voice sounds and video of participants of the creative design meeting. Furthermore, the central controller 82 transmits audio and video data of participants of the creative design meeting at the local creative design system 80 to other remote creative design systems and other teleconference systems.

The creative design controller 80 also can include a gesture library 98. The gesture library 98 can include stored gestures that can be matched to actual gestures performed by a user by moving the interactive stylus and/or hand of a user. For example, one gesture 100 could be shaking an interactive stylus 102 toward a high resolution display 104, as illustrated in FIG. 8 similar to trying to get ink to the tip of the pen. The gesture 100 can be recognized when the stylus 102 is held about 10 cm away from the display 104 to avoid writing activities from accidentally triggering this mode. This gesture 100 can switch the stylus between "blue pen mode with medium width" and "black pen mode with thick width". Another gesture 110 could be shaking an interactive stylus 112 horizontally sideways relative to a high resolution display 114, as illustrated in FIG. 9, as if signaling a desire to erase a sketch. This gesture 110 can work when the stylus is more than about 10 cm from the display 110 to prevent writing gestures from being wrongly interpreted. This gesture 110 can put the interactive stylus 112 in erase mode with a medium sized erase brush.

Another gesture 120 could be shaking an interactive stylus 122 parallel to a vertical axis of a high resolution display 124, as illustrated in FIG. 10. This can be configured to work when the stylus 122 is more than 10 cm from the display 124 to prevent writing gestures from being wrongly interpreted. This gesture 120 can put the stylus 122 in pointer mode that allows selecting objects and dragging them to new positions on the display 124. Yet another gesture 130 could be rotating an interactive stylus 132 in a circular motion about x, y and/or z axis of a high resolution display 134, as illustrated in FIG. 11. This could be used to adjust a parameter forward or back controlled by how many cycles of the circular motion. The radius of the circular motion could also mean something. For example, on a Google Earth type display, these gestures could control zoom, yaw, and pitch of the viewport. The examples of FIGS. 9-11 are shown with the tip of the stylus pointing up for illustrative purposes. It is to be appreciated that in a practical application, the tip of the stylus would be pointing toward the high resolution display.

In another aspect of the invention, the real estate above the display surface can be divided up into 3-D sectors that could each be associated with a context. For example, the circular motion gestures above could do different things depending on which sector they were done in. A form of this is already employed by gestures described above where two sectors are defined, close to the screen where the gestures are disabled, and 10 cm or further from the screen where they are enabled. It is to be appreciated that a variety of different gestures could be employed to perform a variety of functions and that these gestures could be preprogrammed and stored in the gesture library and/or programmed by a user and stored in the gesture library. Additionally, accelerometers could be used to determine the stylus orientation to finer accuracy and this information could be transmitted to the host computer to interpret more complex gestures that involve the orientation of the stylus.

Referring again to FIG. 7, the image analyzer 88 analyzes the image data obtained from the cameras. The image analyzer 88 also decodes the temporal amplitude modulation on the stylus signal to discern whether the stylus's button has been depressed. The 3-D stylus position data stream is fed to the central controller 82 that generates mouse event messages to the central controller's operating system. The central controller 82 also detects 3-D motion gestures and can generate additional commands specific to the currently active application on the display. Once the stylus tip is located in 2 or more of the 4 cameras, the 3-D position of the stylus can be calculated by triangulation. FIG. 12 illustrates triangulation geometry over a high resolution display 150 of a creative design system. Dots 151-154 at the four corners of the display 150 represent the camera locations at the corners of the display 150. The lines 155-158 indicate the direction vector to the detected LED spot 159 derived for each camera. Rays are drawn from each camera position along the direction of the detected spot 159 in that camera's image. Each camera also measures the angle of the spot above the display surface which allows the distance between the stylus tip and the display to be calculated. Two non-opposing rays are sufficient to locate the stylus tip so the four camera design is fairly tolerant of occlusions caused by the user's hand or arm blocking the view of one or two of the cameras.

In an aspect of the invention, the image analyzer 88 computes 2-D ray intersections for pairs of cameras that share a side of the display. A weight is associated with each intersection that favors ray pairs that are not collinear and rays that are longer. A weighted average of the 2-D intersection positions is computed and this determines where the stylus is over the display surface. Distance away from the surface is then estimated by calculating the angular distance of the pen tip from the screen horizon on each camera and applying that to the distance from that camera to the intersection point. Again a weighted sum of the heights derived from each camera can be used.

When one or more of the cameras detects the stylus tip intermittently, the intersection points associated with that camera flicker on and off. As a consequence, the computed mean position shifts in position by an amount proportional to the separation of the individual intersection points as illustrated in FIG. 13. FIG. 13 illustrates three cameras detecting the stylus with two intersections, A and B, being computed. The X marks the mean position derived. FIG. 14 illustrates flicker induced jitter when one of the three cameras fails to detect the stylus tip leaving only the A intersection. Thus the mean position jumps over to the A intersect. If the lower left camera succeeds in detecting the stylus every other frame, the position of the X will jump back and forth between the two positions creating a jitter artifact.

To attenuate this type of position jitter, as illustrated in FIG. 7, a jitter suppressor 90 keeps track of the component intersection point locations from the prior frame and estimates the location of any intersection that drops out on a given frame from its prior location. There are potentially four intersection points, one associated with the two cameras on each side of the bezel. The jitter suppressor 90 performs the following steps: Maintain a four element array of intersection locations, P[i], and associated weights, W[i]. On each new frame, determine which bezel associated intersection points have persisted from the prior frame and use those points to estimate the mean position translation from the prior frame to the current. Call this vector Delta. For the current frame, if the intersection associated with a bezel side, i, has been derived, update P[i] and W[i] with that information. Conversely, if there is no intersection computed, P[i] and W[i] will contain the prior frame's information. In that case, add Delta to P[i] and diminish the value of W[i] so that it has decreasing influence as it ages. Then compute the weighted mean position for the current frame using all of the P[i] and W[i] terms.

It is to be appreciated that moving the mouse cursor accurately on a 3840 by 2160 pixel display requires very precise tracking of the stylus position. The cameras need to operate at a high frame rate to minimize tracking lag. These requirements are conflicting since faster cameras generally have lower pixel resolutions. Therefore, the creative design controller includes a subpixel tracker 86 to gain back precision by calculating the LED spot position to sub-pixel accuracy. The subpixel tracker 86 can employ a number of techniques for computing the spot position. In one aspect of the invention, the subpixel tracker 86 employs a Laplacian of Gaussian peak center moment technique described below to make a significant improvement in tracking precision for estimating the position of a bright image spot.

Figure 15:
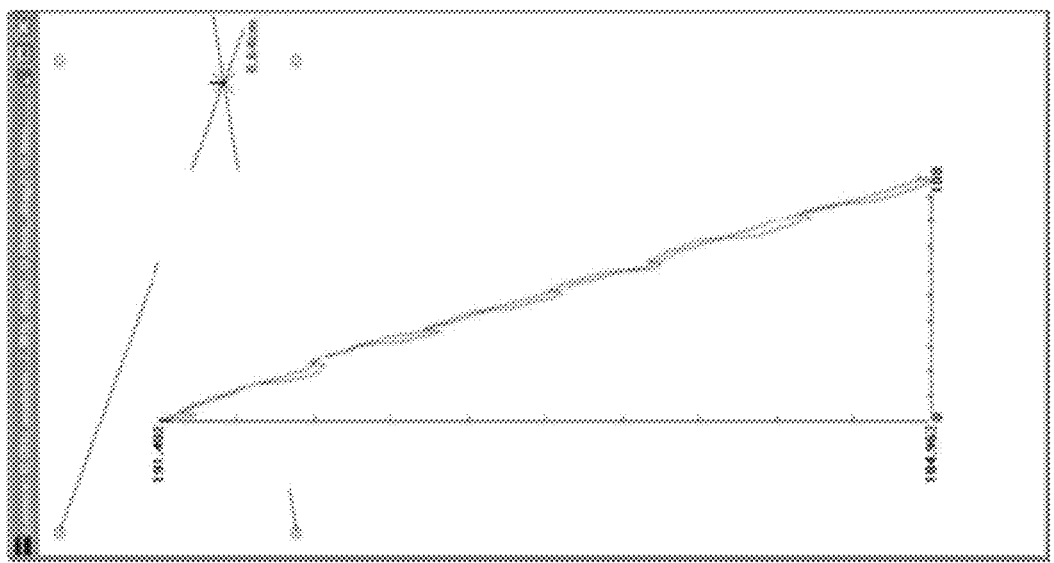
FIG. 15 shows a plot that illustrates a super position of the horizontal image position versus time for a spot tracked by two cameras in accordance with an aspect of the present invention.

If the stylus tip is moved smoothly along the screen surface, the bright spots seen by the cameras will typically move on their respective pixel arrays. FIG. 15 shows a plot that illustrates a super position of the horizontal image position versus time for a spot tracked by two cameras. It can be seen that the slopes of the two plots are approximately the same decreasing by about 6 pixels (moving to the left) over a period of 100 frames (1 second). One plot was shifted vertically to align with the other one. The spot positions were estimated to subpixel resolution and it can be seen that there are small wiggles in the curve with an amplitude of about $\frac{1}{10}^{th}$ of a pixel. These wiggles are likely artifacts picked up by the interpolation method and do not correlate from one plot to the other.

Figure 16:
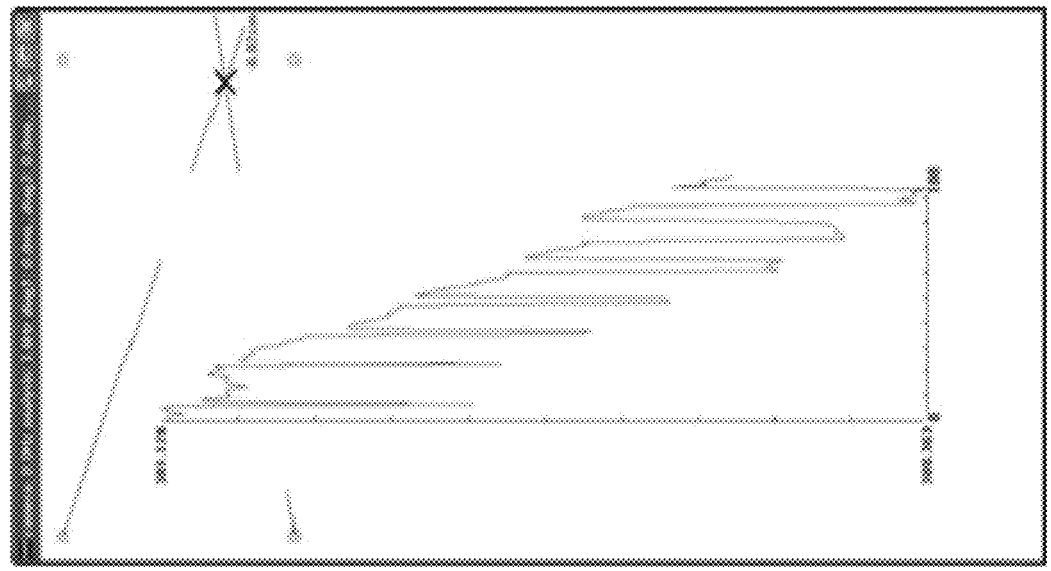
FIG. 16 is a plot illustrating results of a simple center of mass calculation on a fixed sized neighborhood centered on the pixel with the brightest value in accordance with an aspect of the present invention.
Figure 18:
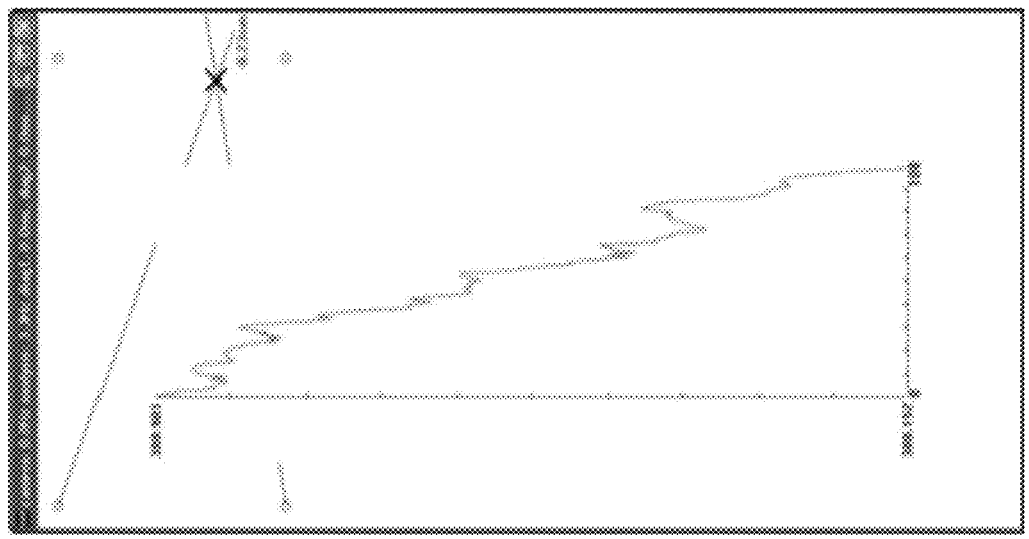
FIG. 18 illustrates the results of computing the center of mass of the LOG values within the zero-crossing contour boundary in accordance with an aspect of the present invention.
Figure 17:
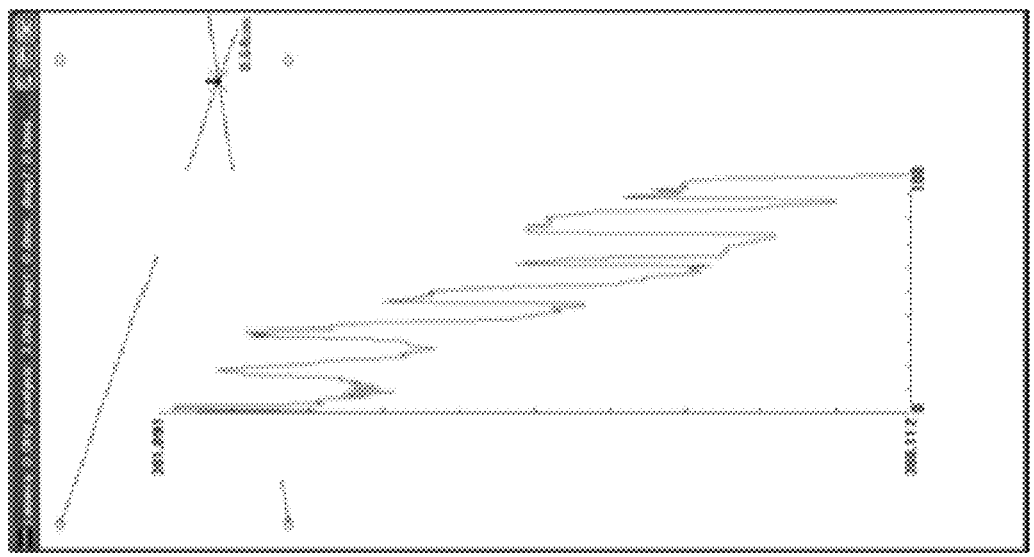
FIG. 17 illustrates the results of computing the spot position by finding the zero-crossings in a Laplacian of Gaussian (LOG) convolution of the image in accordance with an aspect of the present invention.

The subpixel tracker that computes the 2-D position of the stylus tip over the screen is sensitive to the difference between the two curves. This is like stereo disparity and the wiggles in the curves give rise to position wiggles on the screen for the derived stylus position. FIGS. 16-18 plot the difference between the two position curves like those in FIG. 15. Three different interpolation algorithms are compared. The plot in FIG. 16 is a plot illustrating results of a simple center of mass calculation on a fixed sized neighborhood centered on the pixel with the brightest value. This positioning algorithm uses a weighted moment computed on pixel values near the brightest pixel. The entire y axis has a range of 0.76 pixels so the wiggle present is on the order of 0.3 pixels. The plot in FIG. 17 illustrates the results of computing the spot position by finding the zero-crossings in a Laplacian of Gaussian (LOG) convolution of the image. This positioning algorithm estimates the peak position from subpixel estimates of zerocrossings in the LOG convolution of the image. This convolution is like a band pass filter that is tuned for objects near the spot size. The zero-crossing contour in the convolution image makes a ring around the peak and this technique solves for the subpixel location of the ring contour and estimates the center position of the ring. As can be seen from the plot of FIG. 17, the result is slightly better than the plot of FIG. 16 but still on the order of 0.3 pixels. The plot in FIG. 18 illustrates the results of computing the center of mass of the LOG values within the zero-crossing contour boundary. This algorithm uses a moment calculation for all pixels in the positive region of the peak in the LOG convolution. This technique gives a significantly better result as can be seen from the plot in FIG. 18. The wiggle is down at the level of a desired $\frac{1}{30}^{th}$ of a pixel resolution.

Referring again to FIG. 7, the creative design controller further comprises a calibration component 92 for calibrating the creative design system. The calibration component 92 needs to derive the relationship between a pixel on the camera and the physical ray it corresponds to in the display coordinate system. The physical camera positions and orientations, lens focal lengths, lens distortion effects and other related factors all contribute to making a complex relationship between image position and 3-D ray. The calibration component 92 records the image position of the stylus as it is placed on a series of regularly spaced markers around the perimeter of the display screen. The list of positions for each camera is interpolated to generate a table that gives a ray from the camera in screen coordinates for each horizontal pixel position on the camera image. Since the sensor/display geometry is rigid, this calibration should only be required once after installation at a given location.

This calibration component 92 can employ the list of perimeter touch points to derive other calibration parameters including the focal length of the cameras. The known angular spread of the touch points in each camera's view can be used to calculate the lens system focal length. Small variations between the cameras can thus be corrected. The lateral working field of view of each camera can also be derived. The range covered by the boundary touch points can be used to set margins at the left and right of each camera image. Points detected outside these bounds can be safely ignored as reflection artifacts. The camera roll about its optical axis can be derived. Mechanical tolerances allow the camera horizontal axis to deviate away from parallelism with the screen surface. This error affects the tightness of the multi-camera ray intersections especially when the stylus is several inches away from the screen surface. Furthermore, the camera height above the screen surface varies from camera to camera due to mechanical tolerances. The perimeter touch points at known positions on the screen allow computation of this offset. Also, the camera optical axis deviation from parallel with the screen plane can be derived. This parameter is also easily derived from the perimeter touch point data.

The geometric calibration techniques described in the prior section give stable and acceptable results for X and Y positions on the screen surface. Small position or thermal dependent biases do not affect the user experience. This is not the case for the Z position, the stylus to screen distance parameter. A bias error of even a fraction of a millimeter has an effect on the user's ability to write or draw with clean pen touch and pen lift transitions. Thermal expansion associated with the display surface heating can add additional dimensional changes on the order of millimeters that vary with time and position on the screen.

A key observation is that the screen surface defines a mechanical constraint that limits how low stylus Z measurements can go over any fixed (X, Y) location on the display. This constraint can be exploited to determine dynamically a threshold value for asserting a screen touch in the vicinity of that (X,Y) location. In use, measured Z values will spread out over all possible values not favoring anyone other than that associated with the screen's hard constraint. The calibration component 92 employs a temporal histogram of measured Z values to identify the favored Z value constrained by the screen surface. FIGS. 19 and 20 illustrate examples of a first Z histogram 180 and a second Z histogram 190. The horizontal axis is Z in mm with range −10 to +20 mm and a sampling interval of 0.5 mm. The first curve 182 is the histogram, a second spike curve 184 is the derived touch threshold, and a third spike curve 186 is the current stylus height. In FIG. 19, the stylus is about 10 mm above the screen. In FIG. 20, the stylus is touching the screen. The first and second histograms 180 and 190 are from neighboring cells on the screen. The touch threshold has been adjusted by 1 mm over that distance.

The histogram mechanism employs an exponential decay so that more recent measurements dominate very old ones. This can be accomplished by scaling all histogram bins by a factor of (J−1)/J prior to adding a value of 1/J to the histogram bin associated with the current Z value. The decay interval J above determines how quickly new information overrides old. This should be set to match the dynamical characteristics of the system such as thermal drift. If these effects are small or very slow, J can be set to a large value. In the present example system, a value of 1000 is used. If a long time interval elapses since the last update to the histogram, the decay rate can be speeded up to allow the system to "catch up" with any drift that may have occurred during that idle time. In the present example system, J is reduced to 100 for a few seconds and then set back to 1000. The calibration and thermal drift biases vary with position on the screen surface so a single touch threshold would not suffice for the entire screen. Instead, the screen is divided into an M×N grid and each grid cell has its own temporal histogram. The values of M and N are selected so that the Z bias correction does not vary significantly within each cell. The histograms 180 and 190 shown in FIGS. 19-20 below are from neighboring cells which have a small difference in their touch thresholds.

In view of the foregoing structural and functional features described above, methodologies will be better appreciated with reference to FIGS. 21-25. It is to be understood and appreciated that the illustrated actions, in other embodiments, may occur in different orders and/or concurrently with other actions. Moreover, not all illustrated features may be required to implement a method. It is to be further understood that the following method can be implemented in hardware (e.g., a computer or a computer network as one or more integrated circuits or circuit boards containing one or more microprocessors), software (e.g., as executable instructions running on one or more processors of a computer system), or any combination thereof.

Figure 21:
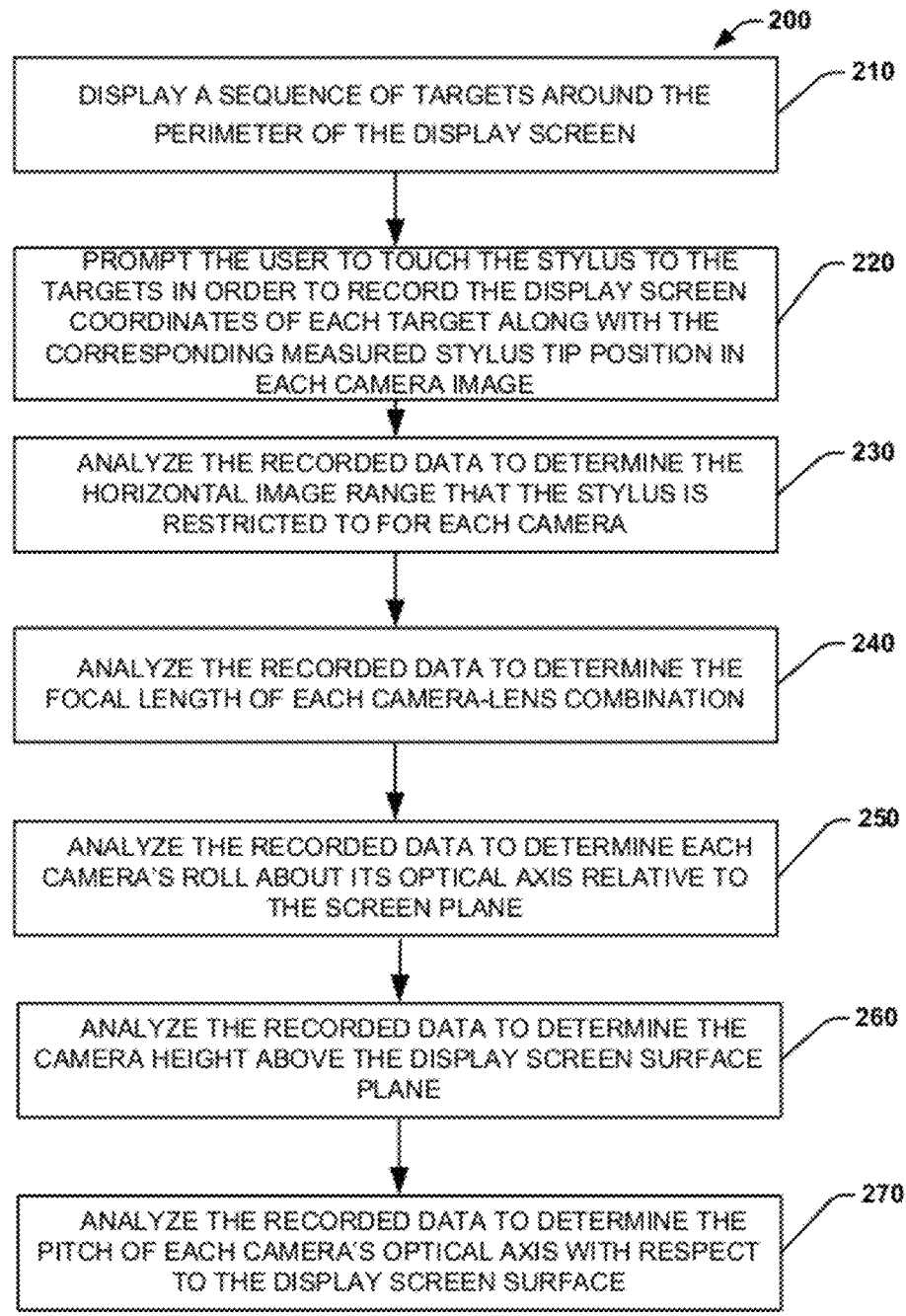
FIG. 21 illustrates a methodology for static calibration of the stylus tracking sensor system in accordance with an aspect of the present invention.

FIG. 21 illustrates a methodology 200 for static calibration of the stylus tracking sensor system in accordance with an aspect of the present invention. The methodology begins at 210 where a sequence of targets are displayed around the perimeter of the display screen. At 220, a user is prompted to touch the stylus to the target in order while the display screen coordinates of each target is recorded, along with the corresponding measured stylus tip position in each camera image. At 230, the recorded data is analyzed to determine the horizontal image range that the stylus is restricted to for each camera. At 240, the recorded data is analyzed to determine the focal length of each camera-Lens combination. At 250, the recorded data is analyzed to determine each camera's roll about its optical axis relative to the screen plane. At 260, the recorded data is analyzed to determine the camera height above the display screen surface plane. At 270, the recorded data is analyzed to determine the pitch of each camera's optical axis with respect to the display screen surface.

Figure 22:
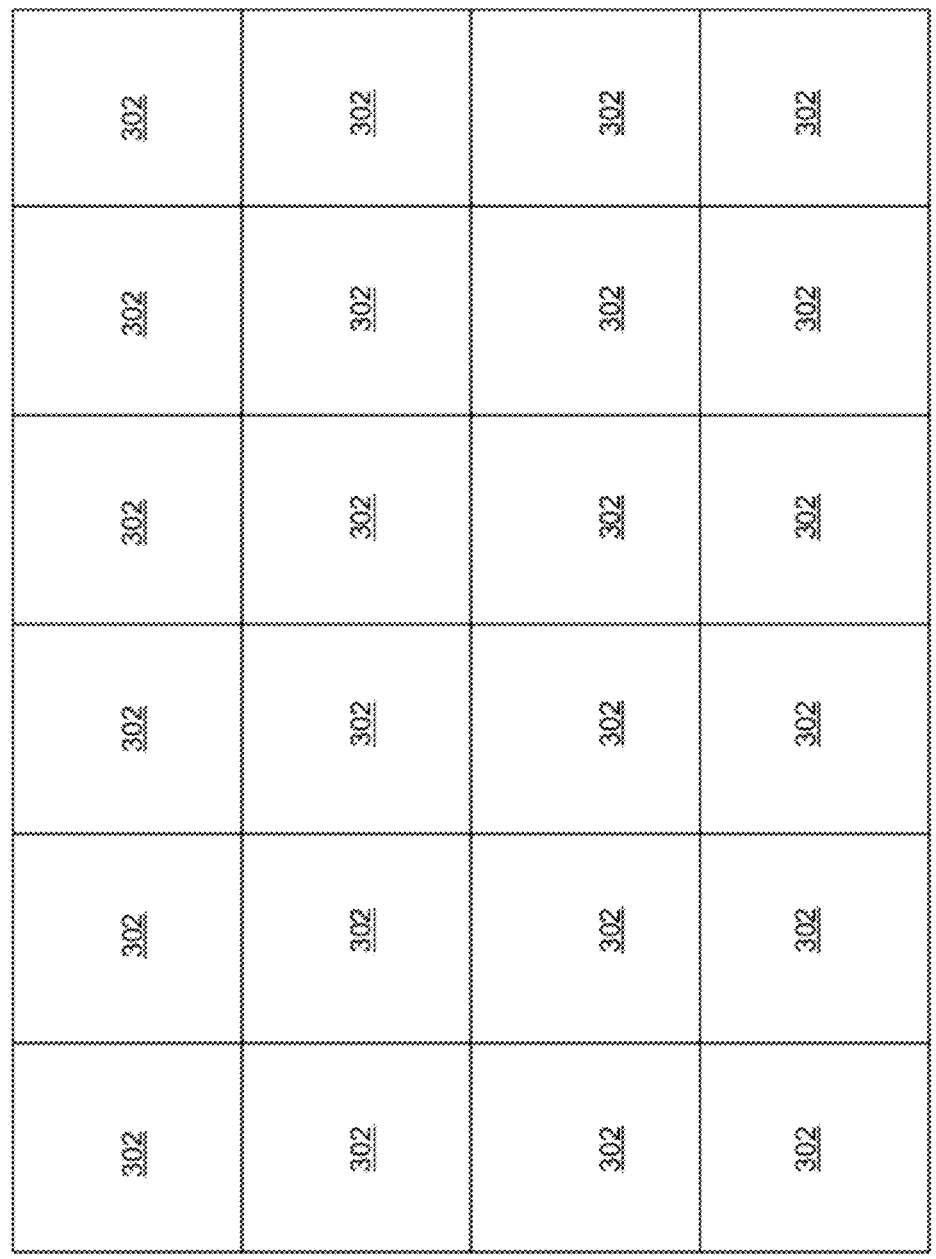
FIG. 22 illustrates an example of a tessellation of a display screen area into a plurality of cells in accordance with an aspect of the present invention.

FIG. 22 illustrates an example of a tessellation of a display screen area 300 into a plurality of cells 302 in accordance with an aspect of the present invention. A separate dynamic calibration can be maintained for each cell 302 in the tessellation. This allows the calibration to accommodate non-flat screen surfaces, thermal effects and other fixed or time-varying errors in the static camera calibration.

Figure 23:
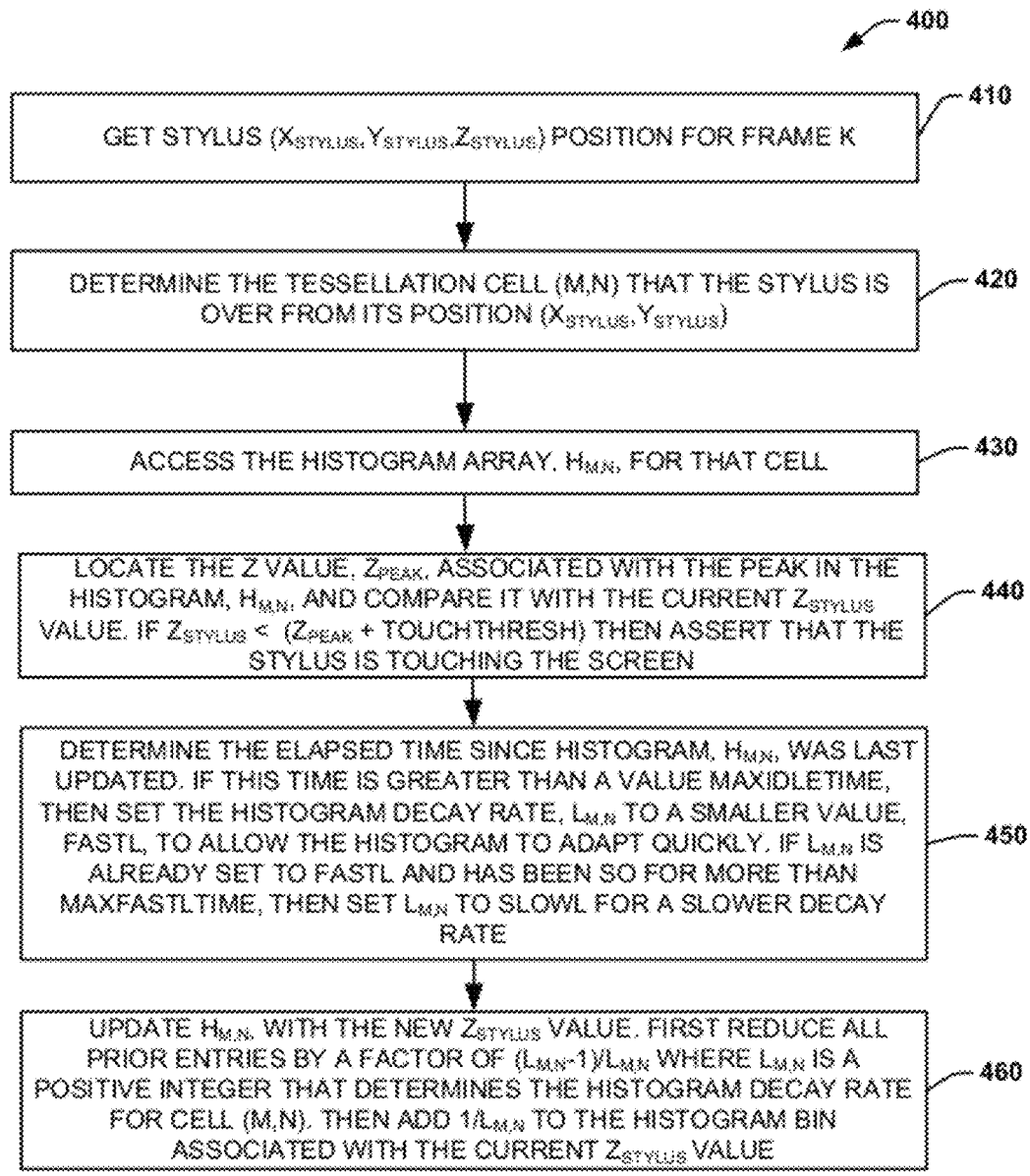
FIG. 23 illustrates a methodology for determining if the stylus is touching the display screen and for dynamically updating the histogram arrays of the tessellated screen illustrated in FIG. 22 in accordance with an aspect of the present invention.

FIG. 23 illustrates a methodology 400 for determining if the stylus is touching the display screen and for dynamically updating the histogram arrays of the tessellated screen illustrated in FIG. 22. The methodology begins at 410 where the stylus position ($x_{stylus}, y_{stylus}, z_{stylus}$) for frame K is determined. At 420, the tessellation cell (m,n) that the stylus is over is determined from its position ($x_{stylus}, y_{stylus}$). At 430, the histogram array, $H_{m,n}$, for that cell is accessed. At 440, the z value, $z_{peak}$ associated with the peak in the histogram, $H_{m,n}$, is located and compare it with the current $z_{stylus}$ value. If $z_{stylus} <$ ($z_{peak}$+TouchThresh) then an assertion is made that the stylus is touching the screen. At 450, the elapsed time since histogram, $H_{m,n}$, was last updated is determined. If this time is greater than a value MaxIdleTime, then set the histogram decay rate, $L_{m,n}$ to a smaller value, FastL, to allow the histogram to adapt quickly. If $L_{m,n}$ is already set to FastL and has been so for more than MaxFastLTime, then set $L_{m,n}$ to SlowL for a slower decay rate. At 460, $H_{m,n}$ is updated with the new $z_{stylus}$ values by first reducing all prior entries by a factor of ($L_{m,n}$−1)/$L_{m,n}$ where $L_{m,n}$ is a positive integer that determines the histogram decay rate for cell (m,n). Then add 1/$L_{m,n}$ to the histogram bin associated with the current $z_{stylus}$ value.

Figure 24:
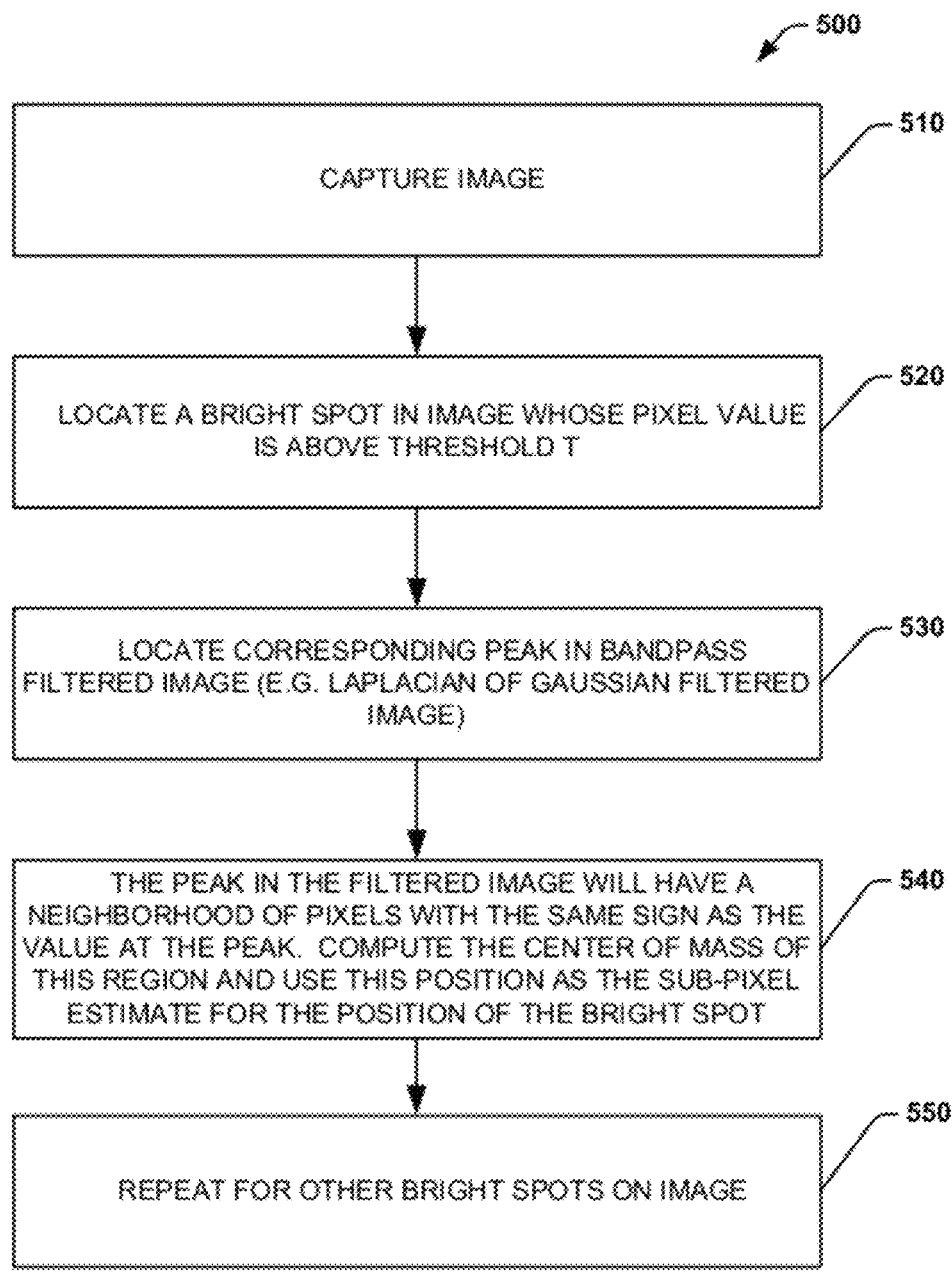
FIG. 24 illustrates a methodology for a peak detection algorithm in accordance with an aspect of the present invention.

FIG. 24 illustrates a methodology 500 for a peak detection algorithm in accordance with an aspect of the present invention. Additional enhancements can be made to this algorithm to insure that the bright spot is actually a spot. In an aspect of the present invention, a bandpass computed image is not computed over the entire area of the image but just over an area large enough to cover the largest expected peak neighborhood centered on each of the identified spots. The methodology begins at 510 where an image is captured. At 520, a bright spot in the image is located whose pixel value is above a Threshold T. At 530, a corresponding peak in the bandpass filtered image is located by taking the Laplacian of the Gaussian filtered image. At 540, the center mass of the peak in the filtered image and neighborhood pixels with the same sign are computed and this position is use as the sub-pixel estimate for the position of the bright spot. At 550, 520-540 is repeated for other bright spots on the image.

Figure 25:
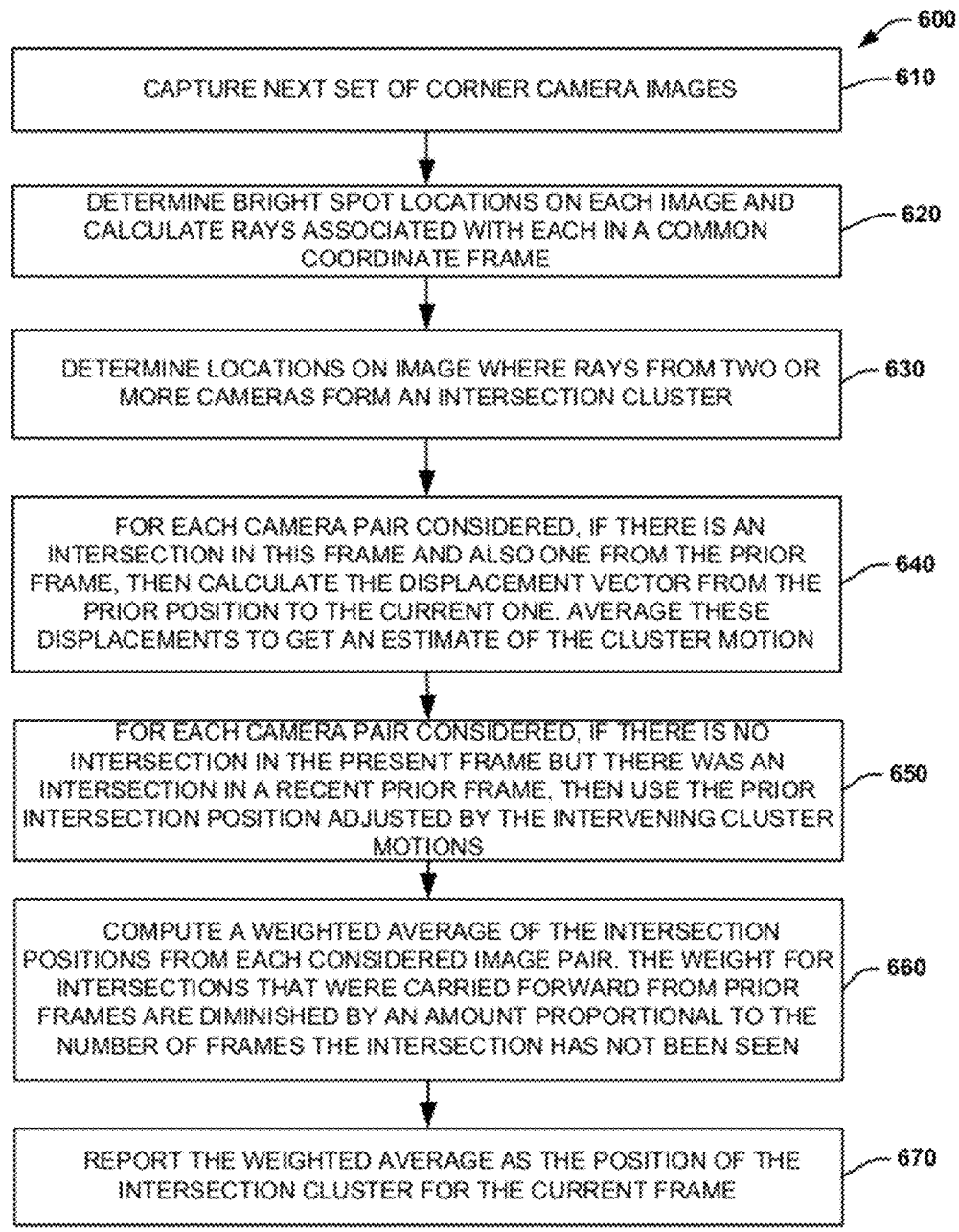
FIG. 25 illustrates a methodology for a flicker induced jitter suppression technique in accordance with an aspect of the present invention.

FIG. 25 illustrates a methodology 600 for a flicker inducted jitter suppression technique in accordance with an aspect of the present invention. The considered camera pairs may be all possible pairs from the set of cameras. It could also be a smaller subset of pairings such as just the adjacent pairs around the display perimeter. For clarity of presentation, we assume that there is only one intersection cluster on the image, that is, only one stylus is being tracked. This process can be generalized to handle multiple styluses in a straight forward manner. The methodology begins at 610 where a next set of corner camera images are captured. At 620, bright spot locations are determined on each image and rays are calculated associated with each in a common coordinate frame. At 630, locations are determined on image where rays from two or more cameras form an intersection cluster. At 640, for each camera pair considered, if there is an intersection in this frame and also one from the prior frame, then calculate the displacement vector from the prior position to the current one and average these displacements to get an estimate of the cluster motion. At 650, for each camera pair considered, if there is no intersection in the present frame but there was an intersection in a recent prior frame, then use the prior intersection position adjusted by the intervening cluster motions. At 660, compute a weighted average of the intersection positions from each considered image pair with the weight for intersections that were carried forward from prior frames are diminished by an amount proportional to the number of frames the intersection has not been seen. At 670, the weighted average is reported as the position of the intersection cluster for the current frame.

Figure 26:
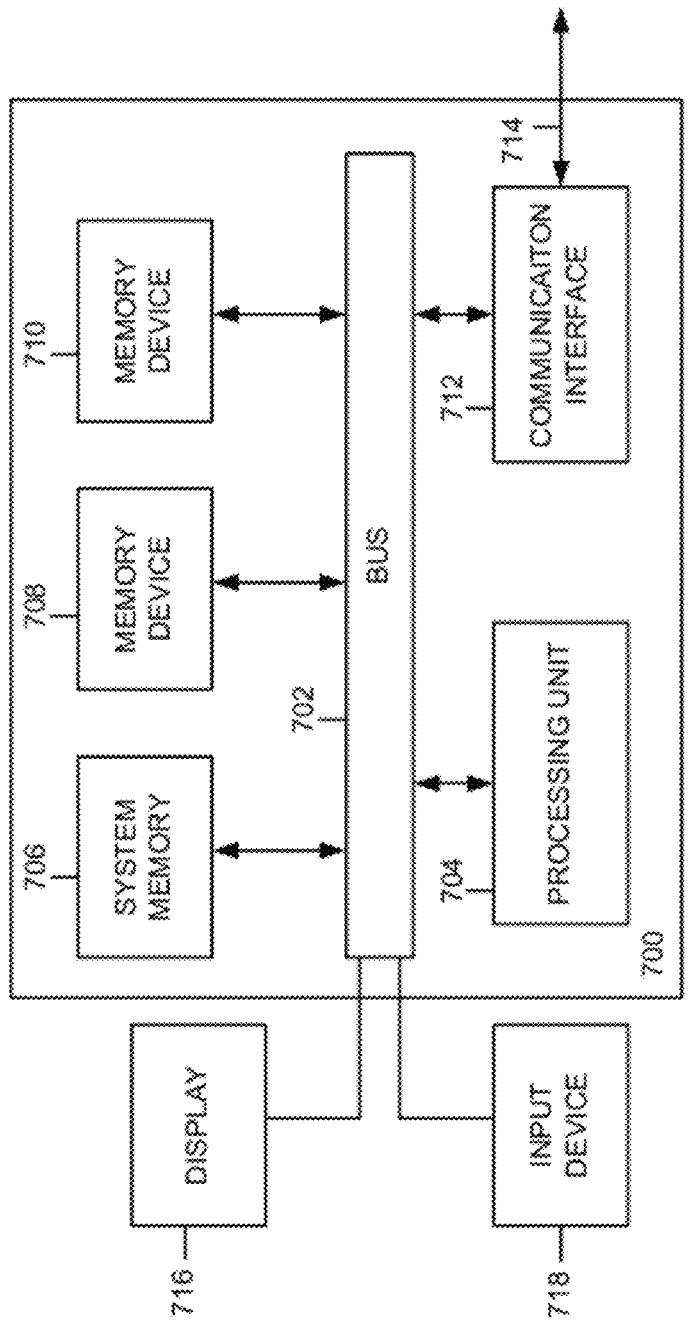
FIG. 26 is a schematic block diagram illustrating an exemplary computer system of hardware components capable of implementing examples of the systems and methods disclosed in FIGS. 1-25 in accordance with an aspect of the present invention.

FIG. 26 is a schematic block diagram illustrating an exemplary computer system 700 of hardware components capable of implementing examples of the systems and methods disclosed in FIGS. 1-25, such as the creative design controller 20 illustrated in FIG. 1. The system 700 can include various systems and subsystems. The system 700 can be a personal computer, a laptop computer, a workstation, a computer system, an appliance, an application-specific integrated circuit (ASIC), a server, a server blade center, a server farm, etc. One of skill in the art will recognize other examples of electronic devices that can serve as the system 700.

The system 700 can include a system bus 702, a processing unit 704, a system memory 706, memory devices 708 and 710, a communication interface 712 (e.g., a network interface), a communication link 714, a display 716 (e.g., a video screen), and an input device 718 (e.g., a keyboard and/or a mouse). The system bus 702 can be in communication with the processing unit 704 and the system memory 706. The additional memory devices 708 and 710, such as a hard disk drive, server, stand alone database, or other non-volatile memory, can also be in communication with the system bus 702. The system bus 702 operably interconnects the processing unit 504, the memory devices 706-710, the communication interface 712, the display 716, and the input device 718. In some examples, the system bus 702 also operably interconnects an additional port (not shown), such as a universal serial bus (USB) port.

The processing unit 704 can be a computing device well-known to those in the art and can include an application-specific integrated circuit (ASIC). The processing unit 704 executes a set of instructions to implement the operations of examples disclosed herein. The processing unit can include a processing core. The additional memory devices 706, 708 and 710 can store data, programs, instructions, database queries in text or compiled form, and any other information that can be needed to operate a computer. The memories 706, 708 and 710 can be implemented as computer-readable media (integrated or removable) such as a memory card, disk drive, compact disk (CD), or server accessible over a network. In certain examples, the memories 706, 708 and 710 can comprise text, images, video, and/or audio, portions of which can be available in different human. The processing unit 704 executes one or more computer executable instructions originating from the system memory 706 and the memory devices 708 and 710. The term "computer readable medium" as used herein refers to a medium that participates in providing instructions to the processing unit 704 for execution.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

Having described the invention, the following is claimed:

1. A creative design system comprising:
   a high resolution display;
   an interactive stylus that includes a transmitter at a tip of the interactive stylus that transmits an encoded signal associated with the interactive stylus;
   a plurality of sensors that track movement of the interactive stylus over the high resolution display by capturing and decoding the transmitted encoded signal as the stylus moves over the high resolution display;
   a calibration component configured to employ data provided from the plurality of sensors to determine and calibrate a distance between the transmitter and a surface of a plurality of different cell regions of the high resolution display to determine if the transmitter is within a threshold distance from a cell region of the plurality of different cell regions of the high resolution display, wherein the distance is measured on an axis normal to the surface of the high resolution display and the cell region of the plurality of different cell regions; and
   a creative design controller configured to display sketches of context in response to the tracking of the movement of the interactive stylus over the high resolution display.

2. The system of claim 1, wherein the transmitter is an infrared transmitter and the plurality of sensors are infrared cameras that capture images of the infrared transmissions of the encoded signal of the interactive stylus and the cameras monitor movement of the transmitter to determine when to display sketched images in response to sketches by a user on the high resolution display.

3. The system of claim 2, wherein the creative design controller employ triangulation utilizing images from at least two cameras of the plurality of cameras.

4. The system of claim 3, wherein the plurality of cameras are four cameras with one of the four cameras being located in each of the four corners of the high resolution display.

5. The system of claim 4, wherein the creative design controller further comprises a jitter suppressor that tracks the component intersection point locations from prior frames of two or more of the cameras and estimates the location of a new intersection point based on weighted averages of the intersection point locations from prior frames and intersections point locations of new frames.

6. The system of claim 1, wherein the creative design controller further comprises a subpixel tracker that gains back precision lost by the plurality of sensors relative to the high resolution display by locating a bright spot of the transmitter, locating a peak in a bandpass filtered image of the bright spot, and computing a center of mass of the bandpass filtered image to determine a sub-pixel estimate for the position of the bright spot.

7. The system of claim 1, further comprising a gesture library, wherein the creative design controller compares images captures by the infrared cameras to determine if gesture movements of at least one of the interactive stylus and a user's hand match a gesture in the gesture library, and performs an associated function if gesture movements of at least one of the interactive stylus and a user's hand matched a given gesture in the gesture library.

8. The system of claim 1, wherein the creative design controller preloads and displays detailed text and figures on the high resolution display and the creative design controller further comprises an image analyzer that analyzes image data from the stylus sensors to determine movement of the stylus sensor to determine when to display sketched images in response to sketches by a user on the high resolution display.

9. The system of claim 1, wherein the creative design controller further comprises a calibration component that displays a sequence of targets on the high resolution display, prompts the user to touch the interactive stylus to the targets in a predetermined order and employs images captured by the plurality of sensors to determine and calibrate one or more parameters of the plurality of sensors employing the captured images.

10. The system of claim 1, wherein the calibration component is further configured to employ histograms to determine and calibrate the distance between the transmitter and the surface of the high resolution display to determine if the transmitter is within a threshold distance from the high resolution display and if the transmitter is not within the threshold distance from the high resolution display.

11. The system of claim 1, wherein the calibration component employs histograms associated with the plurality of different cell regions of the high resolution display to determine and calibrate the distance between the transmitter and the surface of the high resolution display to determine if the transmitter is within a threshold distance from the high resolution display and if the transmitter is not within the threshold distance from the high resolution display in a particular cell region of the plurality of different cell regions of the surface of the high resolution display.

12. The system of claim 1, wherein the tip is a conical tip that deflects light to the sides for better visibility by stylus cameras.

13. The system of claim 1, wherein the interactive stylus employs pressure sensing to determine the pressure exerted on the high resolution display by the tip.

14. A creative design system comprising:
a high resolution display;
an interactive stylus that includes an infrared transmitter located at its tip that generates infrared light;
an infrared camera located in each corner of the high resolution display that captures images to track movement of the infrared light over the high resolution display; and
a creative design controller configured to display preloaded detailed text and figures and generate instructions to display sketches of context in response to movement of the infrared light over the high resolution display based on a determined sub-pixel estimate of a bright spot from the infrared light in the captured images based on the pixel resolution of the infrared camera,
wherein the creative design controller comprises a jitter suppressor that tracks the intersection point locations from prior frames of two or more of the cameras and estimates the location of a new intersection point based on weighted averages of the intersection point locations from prior frames and intersections point locations of new frames.

15. The system of claim 14, wherein the creative design controller employ triangulation to determine a location of the infrared transmitter and gains back precision lost by the cameras relative to the high resolution display by locating the bright spot of the transmitter, locating a peak in a bandpass filtered image of the bright spot, and computing a center of mass of the bandpass filtered image to determine the sub-pixel estimate for the position of the bright spot.

16. The system of claim 14, further comprising a gesture library, wherein the creative design controller compares images captured by the infrared cameras to determine if gesture movements of at least one of the interactive stylus and a user's hand match a gesture in the gesture library, and performs an associated function if gesture movements of at least one of the interactive stylus and a user's hand matched a given gesture in the gesture library.

17. The system of claim 14, wherein the creative design controller further comprises a calibration component that displays a sequence of targets on the high resolution display, prompts the user to touch the interactive stylus to the targets in a predetermined order and employs images captured by the plurality of cameras to determine and calibrate one or more parameters of the plurality of cameras employing the captured images and further employs histograms to determine and calibrate a distance location of the transmitter of the high resolution display to determine when the transmitter is making contact with the display and when the transmitter is not making contact with the high resolution display.

18. A method for providing creative design, the method comprising:
capturing images of a transmitter of an interactive stylus with a plurality of cameras as it is moved over a high resolution display;
analyzing the captured images and employing triangulation to determine a location of the transmitter of the interactive stylus;
generating instructions to display sketches of content in response to the determined movement of the transmitter of the interactive stylus over the high resolution display; and
tracking camera intersection point locations from prior frames of two or more of the cameras and estimating the location of a new intersection point based on weighted averages of the intersection points locations from prior frames and intersections point locations of new frames in response to a camera of the plurality of cameras failing to capture an image of the transmitter of the interactive stylus.

19. The method of claim 18, further comprising locating a bright spot in the captured images, locating a peak in a bandpass filtered image of the bright spot, computing a center of mass of the bandpass filtered image to determine a sub-pixel estimate for the position of the bright spot.

20. The method of claim 18, further comprising determining if gesture movements of at least one of the interactive stylus and a user's hand match a gesture in the gesture library, and performs an associated function if gesture movements of at least one of the interactive stylus and a user's hand matched a given gesture in the gesture library.

21. The method of claim 18, further comprising preloading and displaying detailed text and figures on the high resolution display.

22. The method of claim 18, further comprising displaying a sequence of targets on the high resolution display, prompting the user to touch the interactive stylus to the targets in a predetermined order and employing images captured by the plurality of cameras to determine and calibrate one or more parameters of the plurality of cameras employing the captured images.

23. The method of claim 18, further comprising employing data provided from the plurality of sensors to determine and calibrate a distance between the transmitter and a surface of the high resolution display to determine if the transmitter is within a threshold distance of the high resolution display and if the transmitter is not within the threshold distance of the high resolution display, wherein the distance is measured on an axis normal to the surface.

24. The method of claim 18, further comprising employing histograms associated with different cell regions of the high resolution display to determine and calibrate the distance between the transmitter and the surface of the high resolution display to determine if the transmitter is within a threshold distance from the high resolution display and if the transmitter is not within the threshold distance from the high resolution display in a particular cell region of the surface of the high resolution display.

* * * * *